United States Patent
Bar Shalom et al.

(10) Patent No.: US 11,537,312 B2
(45) Date of Patent: Dec. 27, 2022

(54) MAINTAINING REPLICATION CONSISTENCY DURING DISTRIBUTION INSTANCE CHANGES

(71) Applicant: EMC IP Holding Company LLC, Hopkinton, MA (US)

(72) Inventors: Adi Bar Shalom, Haifa (IL); Zeev Shusterman, Haifa (IL); Lior Zilpa, Holon (IL); German Goft, Pardess Hanna Karkur (IL); Oren Ashkenazi, Haifa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 74 days.

(21) Appl. No.: 17/308,520

(22) Filed: May 5, 2021

(65) Prior Publication Data

US 2022/0357853 A1 Nov. 10, 2022

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/065; G06F 3/0619; G06F 3/067
See application file for complete search history.

(56) References Cited

U.S. PATENT DOCUMENTS 5,381,539 A 1/1995 Yanai et al.
5,551,003 A 8/1996 Mattson et al.
(Continued)

FOREIGN PATENT DOCUMENTS

WO PCT/US2019/024885 1/2020
WO PCT/US2019/024900 1/2020
(Continued)

OTHER PUBLICATIONS

Dell EMC, "Dell EMC VxRack Flex," Dell EMC Product Overview, 2018, 5 pages.
(Continued)

*Primary Examiner* — Jason W Blust
(74) *Attorney, Agent, or Firm* — Ryan, Mason & Lewis, LLP

(57) ABSTRACT

An apparatus comprises a source system comprising a distribution layer, a management component and a plurality of replication components. The distribution layer is configured to obtain an input-output operation corresponding to an address and to identify a given replication component that corresponds to the address based at least in part on a distribution instance. The distribution layer is configured to assign a first distribution identifier corresponding to the distribution instance to the input-output operation and to provide the input-output operation to the given replication component with the first distribution identifier. The given replication component is configured to obtain a second distribution identifier from the management component and to determine whether or not the first distribution identifier is equal to the second distribution identifier. The given replication component is further configured to perform at least one action on the obtained input-output operation based at least in part on the determination.

20 Claims, 11 Drawing Sheets

(56) References Cited

U.S. PATENT DOCUMENTS

| | | | |
|---|---|---|---|
| 5,764,880 | A | 6/1998 | Gerdt et al. |
| 6,052,799 | A | 4/2000 | Li et al. |
| 6,941,420 | B2 | 9/2005 | Butterworth et al. |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,120,579 | B1* | 11/2018 | Patiejunas .............. G06F 3/061 |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2009/0319604 | A1* | 12/2009 | Hatasaki .............. G06F 3/0607 710/52 |
| 2013/0305002 | A1 | 11/2013 | Hallak et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |
| 2020/0081644 | A1* | 3/2020 | Jeyaram ................. G06F 3/064 |

FOREIGN PATENT DOCUMENTS

| | | | |
|---|---|---|---|
| WO | 2020204880 | A1 | 10/2020 |
| WO | 2020204882 | A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006.1598129, pp. 200-211.

Wikipedia, "Raft (Computer Science)," https://en.wikipedia.org/wiki/Raft_(computer_science), Feb. 10, 2020, 4 pages.

Wikipedia, "Paxos (ComputerScience)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting to Know Dell EMC PowerFlex," Version 3.5.x, Rev. 02, Jan. 2021, 66 pages.

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,818 filed in the name of Itay Keller et al. on Mar. 18, 2020, and entitled "Storage System Implementing Snapshot Longevity Ranking for Efficient Management of Snapshots."

U.S. Appl. No. 16/822,848 filed in the name of Itay Keller et al. on Mar. 18, 2020, and entitled "Assignment of Longevity Ranking Values of Storage Volume Snapshots Based on Snapshot Policies."

U.S. Appl. No. 16/823,813 filed in the name of Itay Keller et al. on Mar. 19, 2020, and entitled "Managing Incompressible Data in a Compression-Enabled Log-Structured Array Storage System."

U.S. Appl. No. 16/830,469 filed in the name of Roi Tagar et al. on Mar. 26, 2020, and entitled "Storage Block Balancing Using vol. Part Migration."

U.S. Appl. No. 16/830,473 filed in the name of Yugal Peleg Lieblich et al. on Mar. 26, 2020, and entitled "Replicated State Cluster with Standby Node State Assessment During Leadership Transition."

U.S. Appl. No. 16/830,946 filed in the name of Gil Ben Zeev et al. on Mar. 26, 2020, and entitled "Storage Volume Migration Scheduling Based on Storage vol. Priorities and Specified Constraints."

U.S. Appl. No. 16/832,763 filed in the name of Michal Yarimi et al. on Mar. 27, 2020, and entitled "Managing Storage Device Errors During Processing of Inflight Input/Output Requests."

U.S. Appl. No. 16/834,363 filed in the name of Itay Keller et al. on Mar. 30, 2020, and entitled "Managing Least Recently Used Cache Using Reduced Memory Footprint Sequence Container."

U.S. Appl. No. 16/836,824 filed in the name of Itay Keller et al. on Mar. 31, 2020, and entitled "Management of Volume Snapshots in a Data Storage System."

U.S. Appl. No. 16/888,742 filed in the name of Rivka Matosevich et al. on May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. on Jul. 1, 2020, and entitled "Sharing Memory Resources Between Asynchronous Replication Workloads."

U.S. Appl. No. 16/983,423 filed in the name of Dan Aharoni et al. on Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al. on Sep. 18, 2020, and entitled "Automatic Discovery and Configuration of Server Nodes."

U.S. Appl. No. 17/065,754 filed in the name of Dan Aharoni et al. on Oct. 8, 2020, and entitled "Direct Response to IO Request in Storage System with Remote Replication."

U.S. Appl. No. 17/070,073 filed in the name of Dan Aharoni et al. on Oct. 14, 2020, and entitled "Direct Response to IO Request in Storage System Having an Intermediary Target Apparatus."

U.S. Appl. No. 17/070,288 filed in the name of Anurag Sharma et al. on Oct. 14, 2020, and entitled "Pipeline-Based System for Configuration Checking and Reporting Associated with an Information Processing System."

U.S. Appl. No. 17/071,407 filed in the name of John Moran et al. on Oct. 15, 2020, and entitled "Dynamic Remediation Actions in Response to Configuration Checks in an Information Processing System."

U.S. Appl. No. 17/077,105 filed in the name of Yosef Shatsky et al. on Oct. 22, 2020, and entitled "Volume Tiering in Storage Systems."

U.S. Appl. No. 17/106,988 filed in the name of Rivka Matosevich et al. on Nov. 30, 2020, and entitled "Managing Host Connectivity to a Data Storage System."

U.S. Appl. No. 17/123,525 filed in the name of Itay Keller et al. on Dec. 16, 2020, and entitled "Deferred Reclamation of Invalidated Entries Associated with Replication in a Log-Structured Array."

U.S. Appl. No. 17/145,646 filed in the name of Yosef Shatsky et al. on Jan. 11, 2021, and entitled "Redistribution of Processing Groups between Server Nodes Based on Hardware Resource Utilization."

U.S. Appl. No. 17/232,203 filed in the name of Roman Spiegelman on Apr. 16, 2021, and entitled "Object Synchronization of Server Nodes in a Network Computing Environment."

(56) References Cited

OTHER PUBLICATIONS

U.S. Appl. No. 17/236,256 filed in the name of Doron Tal et al. on Apr. 21, 2021, and entitled "Recovery from Partial Device Error in Data Storage System."
U.S. Appl. No. 17/306,601 filed in the name of Rivka Matosevich et al. on May 3, 2021, and entitled "Managing Replication Journal in a Distributed Replication System."
U.S. Appl. No. 17/308,166 filed in the name of Adi Bar Shalom et al. on May 5, 2021, and entitled "Journal Barrier Consistency Determination."

* cited by examiner

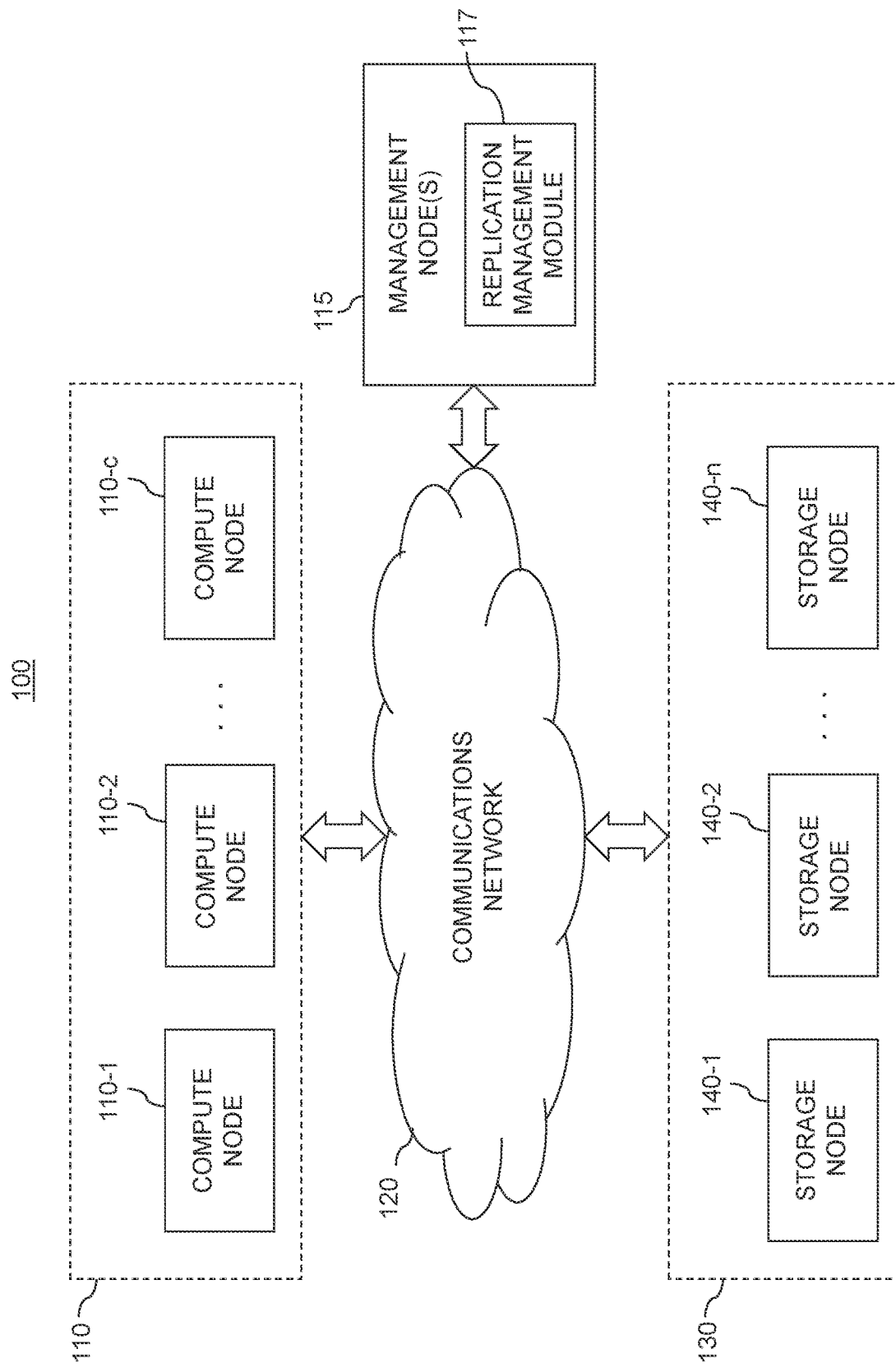

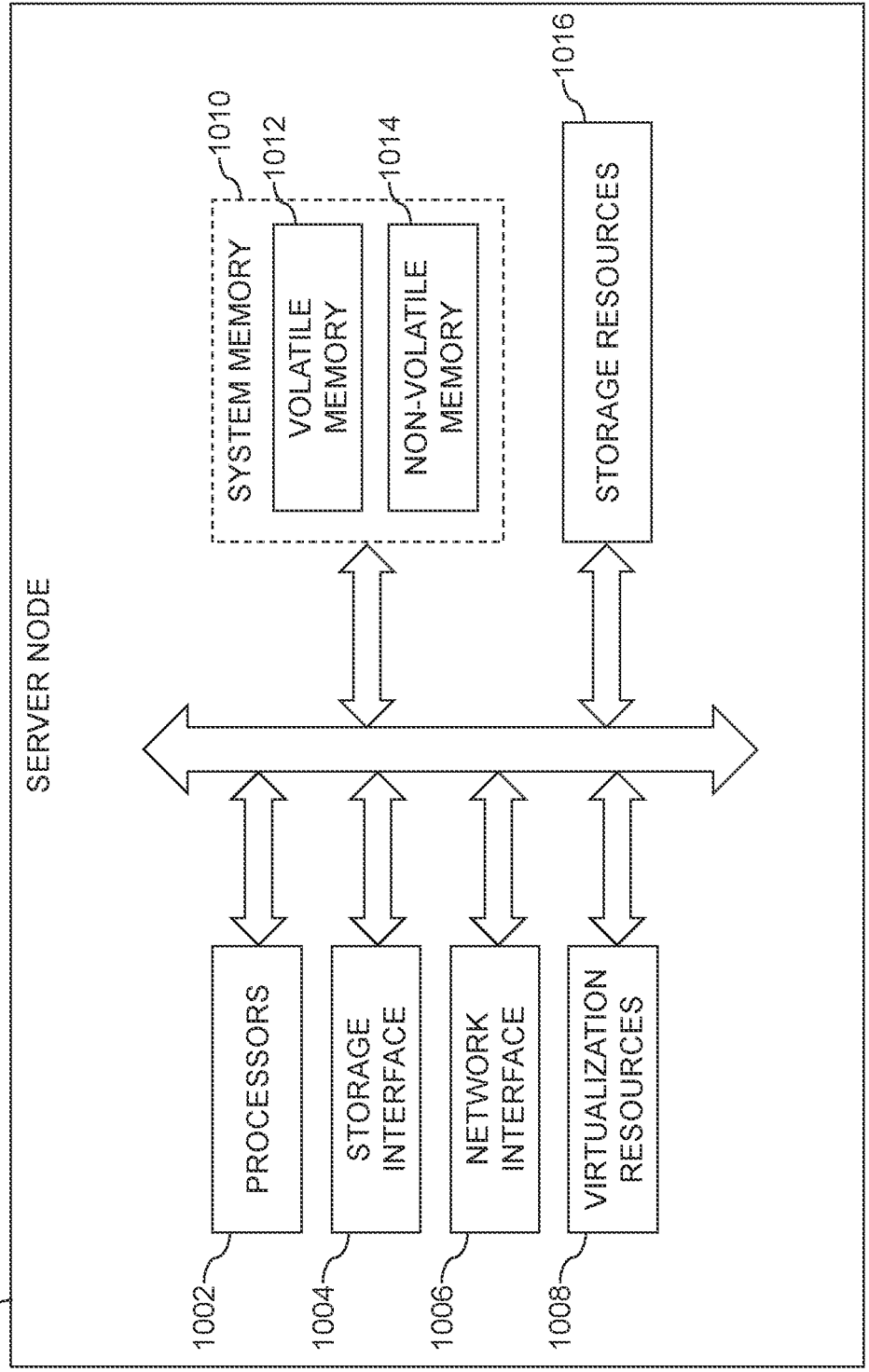

MAINTAINING REPLICATION CONSISTENCY DURING DISTRIBUTION INSTANCE CHANGES

TECHNICAL FIELD

This disclosure relates generally to data storage management in information processing systems and, more particularly, to data replication techniques for data storage systems.

BACKGROUND

Information processing systems typically implement data protection and disaster recovery techniques to protect against loss of critical system and application data. For example, data replication is one type of data protection technique that can be utilized to support disaster recovery. In general, data replication involves storing primary data (e.g., production data) at a primary site and storing a copy of the primary data at one or more remote sites to maintain one or more replicas of the primary data. There are two types of data replication techniques which depend on whether replication of the primary data is performed synchronously or asynchronously.

In particular, synchronous replication generally involves writing data to both a source (primary) volume and a destination (replica) volume before acknowledging completion of the input-output (IO) write operation to a host application. In this regard, synchronous replication is utilized for applications which require the primary data and the replica data to remain synchronized in real-time to provide high availability of critical systems or applications. In the event of a failure at the primary site, applications can failover to a remote site and resume operation with assurance of zero data loss. On the other hand, asynchronous replication generally involves writing data to the source volume, and acknowledging completion of the IO write operation to the host application before the data is replicated to the destination volume. With asynchronous replication, the IO write operations at the source site are logged in a replication journal, and the replication journal is periodically transmitted at scheduled times to a destination site which processes the replication journal to replicate the data to the destination volume.

SUMMARY

In one embodiment, an apparatus comprises a source system comprising at least one processing device coupled to memory. The at least one processing device implements a distribution layer, a management component and a plurality of distributed replication components. The distribution layer is configured to obtain an input-output operation corresponding to an address and to identify a given replication component of the plurality of distributed replication components that corresponds to the address based at least in part on a distribution instance obtained from the management component. The distribution layer is further configured to assign a first distribution identifier corresponding to the distribution instance to the input-output operation and to provide the obtained input-output operation to the given replication component with the first distribution identifier. The given replication component is configured to obtain a second distribution identifier from the management component and to determine whether or not the first distribution identifier is equal to the second distribution identifier. The given replication component is further configured to perform at least one action on the obtained input-output operation based at least in part on the determination of whether or not the first distribution identifier is equal to the second distribution identifier.

Other embodiments of the disclosure include, without limitation, systems and articles of manufacture comprising processor-readable storage media, which are configured to manage utilization of shared memory resources among a plurality of asynchronous replication workloads.

BRIEF DESCRIPTION OF THE DRAWINGS

FIGS. 1A and 1B schematically illustrate an information processing system comprising a data replication system according to an exemplary embodiment of the disclosure.

FIG. 10 schematically illustrates a framework of a server node for implementing a storage node which hosts a data replication system according to an exemplary embodiment of the disclosure.

DETAILED DESCRIPTION

Exemplary embodiments will be described herein with reference to exemplary information processing systems which implement data storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1B:
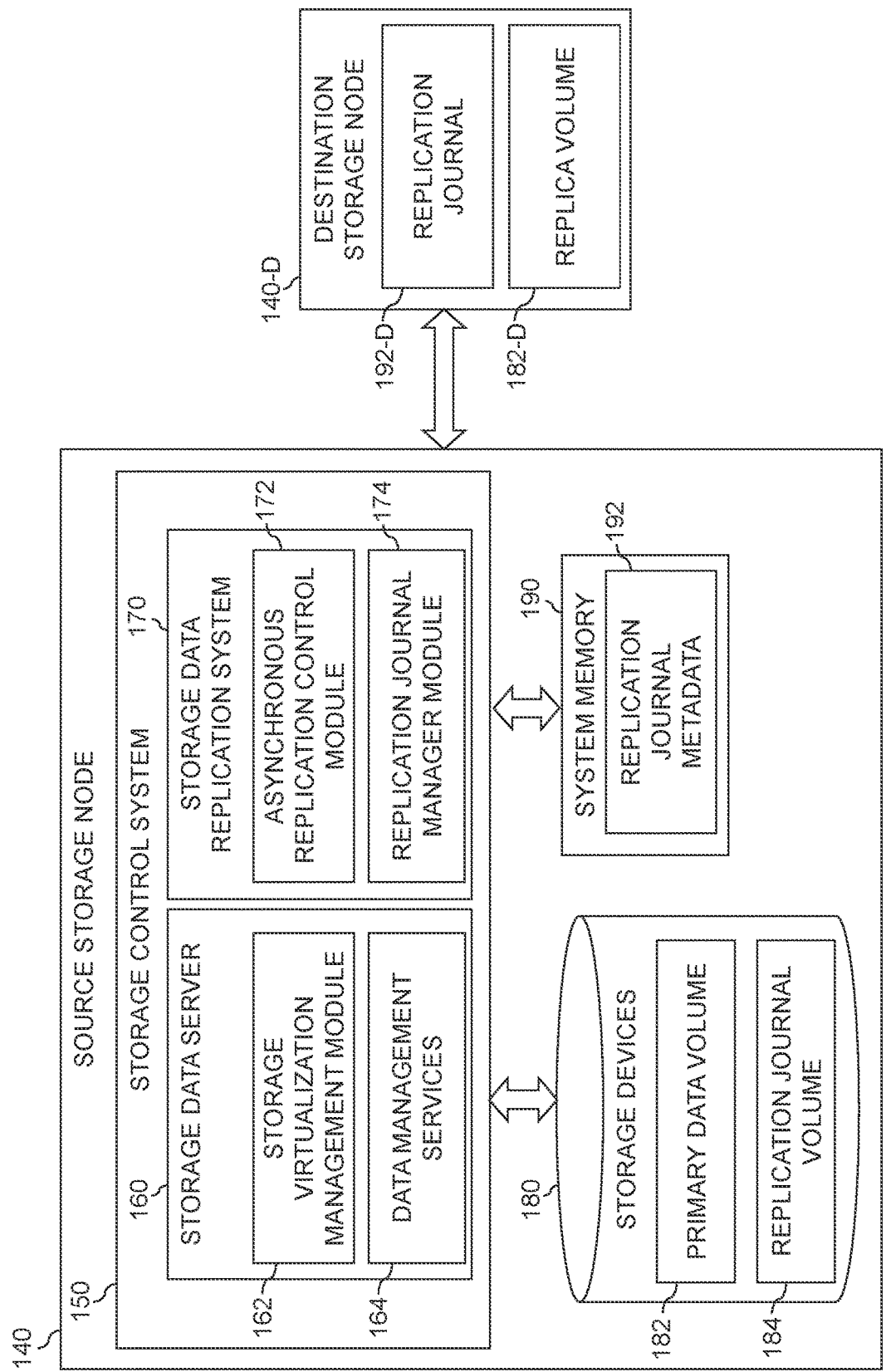

FIGS. 1A and 1B schematically illustrate an information processing system comprising a data replication system which is configured according to an exemplary embodiment of the disclosure. More specifically, FIG. 1A schematically illustrates an information processing system 100 which comprises a plurality of compute nodes 110-1, 110-2, ..., 110-c (collectively referred to as compute nodes 110), one or more management nodes 115 (which implement a management layer of the system 100), a communications network 120, and a data storage system 130 (which implement a data storage layer of the system 100). The data storage system 130 comprises a plurality of storage nodes 140-1, 140-2, ..., 140-n (collectively referred to as storage nodes 140, or each singularly referred to as storage node 140). In the context of exemplary embodiments as discussed in further detail below, the management nodes 115 implement a data replication management module 117 which implements methods to perform various management functions to control, e.g., asynchronous data replication operations that are performed by the storage nodes 140. FIG. 1B schematically illustrates an exemplary framework of some or all the storage nodes 140.

In particular, as shown in FIG. 1B, the storage node 140 comprises a storage control system 150 comprising a storage data server 160, a storage data replication system 170, local data storage devices 180, and system memory 190. The storage data server 160 comprises various modules including, but not limited to, a storage virtualization management module 162 and one or more modules to support data management services 164. The storage data replication system 170 comprises various modules including, but not limited to, an asynchronous replication control module 172, and a replication journal manager module 174, the functions of which will be explained in further detail below. In some embodiments, the storage control system 150 comprises a software-defined storage (SDS) system wherein, the storage data server 160 and the storage data replication system 170 are integrated software modules of the storage control system 150. In other embodiments, the storage data replication system 170 comprises a stand-alone software system that is separate from the storage control system 150 but configured to operate in conjunction with the storage control system 150. In some embodiments, a separate replication node comprises the storage data replication system 170 and is configured to operate in conjunction with the storage node 140. It is to be further noted that the storage control system 150 may include additional modules and other components that are typically included in various implementations of storage control systems (e.g., SDS systems), although such additional modules and other components are omitted for clarity and simplicity of illustration.

The compute nodes 110 illustratively comprise physical compute nodes and/or virtual compute nodes which host applications, process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. The compute nodes 110 are configured to write data to and read data from the storage nodes 140 in accordance with applications executing on the compute nodes for system users. The compute nodes 110 illustratively issue IO requests that are processed by a corresponding one of the storage nodes 140. The term IO request as used herein refers to at least one of input and output. For example, an IO request may comprise a write request and/or a read request directed to stored data of a given one of the storage nodes 140 of the data storage system 130.

The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising SDS systems, clustered or distributed virtual and/or physical infrastructure. The term "data storage system" as used herein should be broadly construed and not viewed as being limited to storage systems of any particular type or types. A storage system in some embodiments can be implemented using a combination of storage nodes and compute nodes. In some embodiments, the storage nodes 140 comprise storage server nodes (e.g., server node 1000, shown in FIG. 10) having one or more processing devices each having a processor and a memory, possibly implementing virtual machines and/or containers, although numerous other configurations are possible. In some embodiments, one or more of the storage nodes 140 can additionally implement functionality of a compute node 110, and vice-versa. The term "storage node" as used herein is therefore intended to be broadly construed as a server node (e.g., a physical server machine) which comprises local persistent storage devices (e.g., storage devices 180) and which comprises a storage control system (e.g., storage control system 150, FIG. 1B) that is configured to manage and control access to the local persistence storage devices. A storage node may further comprise one or more compute nodes to process data and execute tasks/workloads.

In some embodiments, as schematically illustrated in FIG. 1B, the storage node 140 is a physical server node or storage appliance, wherein the data storage devices 180 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 180 may be implemented in the storage node 140. In this regard, the term "storage device" as used herein is intended to be broadly construed, so as to encompass, for example, SSDs, HDDs, flash drives, hybrid drives or other types of storage media. The data storage devices 180 are coupled to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 180 and control 10 access to the storage devices 180 and/or other storage resources (e.g., DAS or NAS resources) that are directly attached or network-connected to the storage node 140. As noted above, in some embodiments, the storage control system 150 is implemented as part of an SDS system which supports the virtualization of the storage devices 180 by separating the control and management software from the underlying hardware architecture of the storage devices 180. The storage control system 150 runs on a server operating system of the storage node 140 to provide storage services. More specifically, in an SDS environment, the storage data server 160 is configured to abstract storage access services from the underlying storage hardware, and thereby control and manage 10 requests issued by the compute nodes 110, as well as support networking and connectivity. In this instance, the storage control system 150 comprises a software layer that is hosted by the storage node 140 and deployed in the data path between the compute nodes 110 and the storage devices 180 of the storage node 140, wherein the storage control system 150 is configured to process 10 requests from the compute nodes 110 by accessing the storage devices 180 to store/retrieve data to/from the storage devices 180 based on the IO requests.

In an SDS environment, the storage control system 150 comprises the storage data server 160 that is installed on each storage node that will contribute its storage to the data storage system. The storage control system 150 is configured to provision, orchestrate and manage the local storage resources (e.g., the storage devices 180) of the storage node 140. For example, the storage data server 160 implements methods that are configured to create and manage storage pools (e.g., virtual pools of block storage) by aggregating capacity from the storage devices 180. The storage data server 160 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the SDS environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage data server 160 contributes some or all of its local block storage (HDDs, SSDs, PCIe, NVMe and flash cards) to an aggregated pool of storage of a storage server node cluster (e.g., cluster of storage nodes 140) to implement a server-based SAN (e.g., virtual SAN). In this configuration, each storage node 140 is part of a loosely coupled server cluster which enables "scale-out" of the SDS environment, wherein each instance of the storage data server 160 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage data servers 160 operating to create and expose volumes of a storage layer, the SDS environment comprises other components such as (i) data storage clients that consume the storage layer and (ii) metadata managers that coordinate the storage layer. More specifically, on the client-side (e.g., compute nodes 110), an SDS data storage client (SDC) component is a lightweight block device driver that is deployed on each node (e.g., server node) that consumes the shared block storage volumes that are exposed by the storage data servers 160 of the storage nodes 140. A given SDC component presents the volumes as block devices to the application(s) located on the server node on which the given SDC component is installed. The SDC component exposes block devices representing the virtual storage volumes that are currently mapped to that host. In particular, the SDC component serves as a block driver for a client (server), wherein the SDC component intercepts IO requests issued by a compute node 110, and utilizes the intercepted IO request to access the block storage that is managed by the storage control systems 150. The SDC component provides the operating system or hypervisor (which runs the SDC component) access to the logical block devices (e.g., volumes).

In the SDS environment, the primary data and copies of each storage volume are distributed over the storage nodes 140, and each SDC component has knowledge of which storage data server 160 holds its block data, so multipathing can be accomplished natively through the SDC components. In particular, each SDC component knows how to direct an IO request to the relevant destination SDS data server (e.g., storage control system 150). In this regard, there is no central point of routing, and each SDC component performs its own routing independent from any other SDC component. This implementation prevents unnecessary network traffic and redundant SDS resource usage. Each SDC component maintains peer-to-peer connections to the storage control systems 150 that manage the storage pool so each SDC component can communicate over multiple pathways to the storage nodes 140 which store the data. The multi-point peer-to-peer communication allows the SDC components to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 each comprise one or more SDS metadata manager (MDM) components, wherein the management nodes 115 comprise a tightlycoupled cluster of nodes that are configured to supervise the operations of the storage cluster and manage storage cluster configurations. The MDM components operate outside of the data path and provide the relevant information to the SDS clients and storage servers to allow such components to control data path operations. The MDM components are configured to manage the mapping of SDC components to the storage data servers 160. The MDM components manage various types of metadata that are required for system operation of the SDS environment such as configuration changes, managing the SDC components and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyper-converged deployment, a single-layer deployment is implemented in which the storage data clients and storage data servers (e.g., storage control systems 150) run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, the various modules of the storage control system 150 of FIG. 1B collectively provide data storage and management methods that are configured to perform at least some of the following functions. In particular, the storage data server 160 may comprise the storage virtualization management module 162 which implements any suitable logical volume management (LVM) system that is configured to create and manage local storage volumes by aggregating the local storage devices 180 into one or more virtual storage pools that may be thin-provisioned for maximum capacity, and logically dividing each storage pool into one or more storage volumes that may be exposed as block devices (e.g., raw logical unit numbers (LUNs)) to the compute nodes 110 to store data. In some embodiments, the storage devices 180 are configured as block storage devices where raw volumes of storage are created and each block can be controlled as, e.g., an individual disk drive by the storage control system 150. Each block can be individually formatted with a same or different file system as required for the given data storage system application. The storage pools are primarily utilized to group storage devices based on device types and performance. For example, SSDs are grouped into SSD pools, and HDDs are grouped into HDD pools. Furthermore, in some embodiments, the data management services 164 implement methods to support various data storage management services such as data protection, data migration, data deduplication, thin provisioning, snapshots, data backups, etc.

The storage data replication system 170 implements various methods that are configured to support data replication operations. For example, the asynchronous replication control module 172 implements methods that are configured to support asynchronous data replication operations to replicate data of a primary (source) data volume 182, which is stored in the local data storage devices 180 of the source storage node 140, to a replica volume 182-D that is stored on local data storage devices of a destination storage node 140-D. It is to be understood that some or all of the storage nodes 140 of the data storage system 130 implement an instance of the storage data replication system 170, wherein a given storage data replication system 170 on a given storage node 140 can serve as (i) a source replication system (e.g., to replicate data of the local primary data volume 182 to a remote replica volume 182-D, as shown in FIG. 1B), and/or (ii) a destination replication system to store data in a local replica volume using a replication journal and associated data received from a source replication system.

It is to be noted that the term "replication consistency group" as used herein refers to a logical container for volumes whose application data need to be replicated with consistency. A replication consistency group contains volume pairs, which are pairs of volumes with a primary volume at a source node and a replica volume at a destination node, wherein the data of the primary volume is replicated to the replica volume. For example, in the exemplary embodiment of FIG. 1B, the primary data volume 182 and the replica volume 182-D comprise a volume pair.

The replication journal manager module 174 implements methods that are configured to generate and manage replication journals for asynchronous replication workloads that are processed by the storage data replication system 170. For example, a journal-based asynchronous replication system will buffer new writes to either cached or dedicated volumes, sometimes referred to as either journal volumes or write intent logs, before asynchronously transmitting the replication journals to destination nodes. The replication journal for a given replication workload is divided into data collection intervals, also referred to herein as journal barrier-intervals, journal barriers or just as barriers, by generating journal barriers at given points in time to enable consistency between the primary volume and replication volume.

More specifically, as IO write data is collected for a given replication workload over time, a journal barrier is created at a given point in time, and all IO write data that is collected up to the time of the journal barrier (and following a previously generated journal barrier) is transmitted to a replica (destination) system for synchronizing the journal data to the replica volume. In this regard, journal-based asynchronous replication enables the application of write sequence metadata so that when the contents of the journal volume are copied to the destination node, writes are committed to the replica volume in an order that maintains write order fidelity with the source volume.

In the source storage node 140, for replicated volumes, the compute nodes 110 (e.g., the SDC components that execute on the compute nodes 110) communicate with the storage data replication system 170. For non-replicated volumes, the compute nodes 110 communicate directly with the storage data server 160 as the storage devices 180 are managed by the storage data server 160. The storage data replication system 170 serves as a pipeline for IOs as application IOs (both reads and writes) intended for replication volumes are sent from a compute node 110 to the storage data replication system 170. The source storage data replication system 170 processes all IO requests associated with replication volumes and packages the IO write data into a consistent journal barrier and distills the write data (e.g., write-folding) so that only the most recent writes are included. The source storage data replication system 170 transmits the journal barrier for a given asynchronous replication workload to a target storage data replication system in the destination storage node 140-D. At the destination storage node 140-D, the target storage data replication system stores the replication journal 192-D and processes the replication journal barrier to update the replica volume 182-D.

At the source storage node 140, the replication journal manager module 174 implements methods that are configured to store the IO write data at the source node before it is sent to the destination node. At the destination, the journal stores the data before it is applied to the destination volumes. Once the IOs are sent to the destination journal and safely stored there, they are cleared from the source journal. Once the IOs are applied to the target volumes, they are cleared from the destination journal.

The manner in which IO data is stored in a replication journal will vary depending on the implementation. For example, in some embodiments, a copy of the IO write data is stored in a replication journal volume 184 in storage (e.g., HDD, or SSD storage) while replication journal metadata 192 is stored in the system memory 190. In this instance, the replication journal volume 184 comprises an actual copy of the data that was written to the primary data volume 182, while the replication journal metadata 192 would comprise information regarding the IO write transaction, including, but not limited to, one or more identifiers, a time stamp (denoting date and time at which the IO write transaction was received by source), a write size of the data block, a location (pointer) in the replication journal volume 184 where the actual IO write data is stored, a location in the replica volume 182-D where the data is to be written, etc. In some embodiments, the actual IO write data is stored in the system memory 190 in association with the journal metadata, in which case the replication journal metadata 192 would not include a pointer to the IO write data in the replication journal volume 184.

In some cases, the times at which journal barriers are generated for dividing the replication journal of a given replication workload into data collection intervals is related, at least in part, to the recovery point objective for the given replication workload. The recovery point objective is user-defined according to, e.g., service level agreements. For example, the data collection interval may be determined based at least in part on the recovery point objective and internal system conditions in a manner which enables compliance with the recovery point objective.

As an example, the data replication management module 117 may be configured to implement and manage data replication policies that describe different types of recovery, such as, e.g., disaster recovery, operational recovery, logical corruption recovery, etc. The objectives of the disaster recovery plans may be formulated in terms of attributes including, but not limited to, recovery point objectives (RPO) and recovery time objectives (RTO). In general, RPO refers to an acceptable amount of data loss measured in time relative to when failure event or disaster occurs at the primary (source) system. More particularly, RPO denotes a maximum acceptable delay time between the time when data is committed at the primary site and the time when the data is committed to the replica (destination) system. The term RTO denotes the time to recover from a failure event or disaster.

For example, the time difference between a failure event at the primary system and a preceding replication event should not exceed the specified RPO for the replication system, otherwise the failure event would result in more data loss than what is acceptable under the specified RPO. The RPO value may be specified when configuring the replication system, and may be utilized to manage replication scheduling. An RPO can be specified in hours, minutes, or seconds, etc., depending on the given criticality of the application data, customer needs, etc. In another example, the time difference between a system recovery and a failure event should not exceed the specified RTO for recovery of the data storage system. For a particular system, an RTO can be specified in days, hours, minutes, or seconds, depending on, e.g., the application priority, business requirements, etc. For high priority applications, failover services can be implemented to enable RTO in seconds or any other amount of time.

As described above, scale-out storage systems achieve scalable performance by distributing the data and its associated processing across distributed components of the storage system such as, e.g., the compute nodes 110, storage nodes 140, management node(s) 115 or their SDC components, SDS components and MDM components. Replication data handling is also distributed, e.g., across SDS data replication (SDR) components of the compute nodes 110, to achieve scalable performance at both the replication source and replication destination.

The distribution of the data processing may change following events such as a failure of a system component or the addition or removal of a system component, e.g., a node, SDC component, SDR component, SDS component or any other component. In a scale-out storage system where capabilities may be scaled as needed based on demand or other factors, such changes in the distribution may occur often and in a manner that allows the system to function and serve IOs while handling the data distribution change in an effective manner. In some cases, the distribution of the data processing and handling between the components of the source and destination systems may also be asymmetric where, for example, each source component may collect and send data to many destination components or vice versa.

In a journal-based replication from a source system to a destination system, such as that described above, the replacement of the existing image with the new image comprises applying the data of the journal entries to the replication volume. The data of a consistent image can be efficiently applied with no need of coordination between the SDR components of the destination system because each SDR component of the destination system applies all of the journal entries to the blocks assigned to it by the distribution for the replication. Eventual arrival to a shared consistent image is guaranteed when all the destination SDR components apply all the consistent images.

To recover applications from the destination system the consistent image stored on the destination system has to represent an image of the data that may have existed on the source system at one time. To achieve this consistency, the correct order of IOs needs to be preserved in the destination system. For example, if a user wrote IO A to address X before writing IO B to address X in the source volume, then IO B will be written after IO A to the destination volume or only IO B may be written to the destination volume since a write of IO A to the destination volume is not needed to preserve the write order fidelity in a case where a consistency point is at or after the write of IO B. This property is a necessary building block for achieving consistency between the source and destination systems.

In a distributed scale-out system such as that described above, replication layer (RL) components such as, e.g., the SDR components, are configured to send and apply the data independently and without coordination. This functionality may be important in a scale-out system since extra coordination between the RL components may be resource expensive and can also slow down the replication speed. In a replication synchronization path, the MDM component coordinates when each journal barrier will be sent from the source system to the destination system by the SDR components of the source system in an order that will guarantee consistency. However, in some cases, where the MDM component of the source system or the MDM component of the destination system changes the corresponding data distribution, e.g., from one SDR to another, there may be cases where the journal barrier may be sent from the source system to the destination system by the SDR components in a manner that causes the data to be stored in the wrong order.

Figure 2:
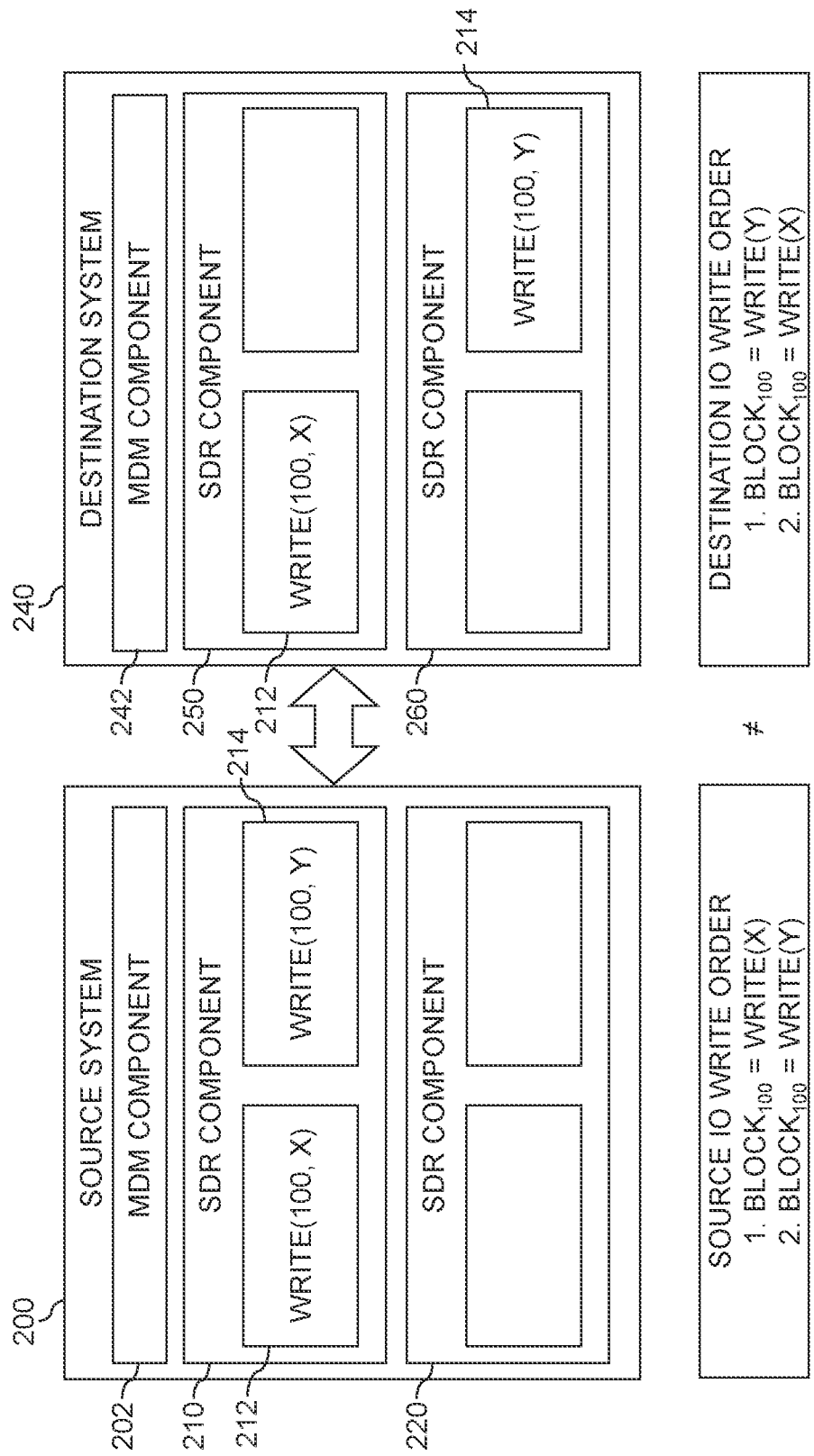
FIG. 2 illustrates an example scenario in which a distribution change in a destination system has occurred according to an exemplary embodiment of the disclosure.

With reference now to FIG. 2, an example scenario of a change in the data distribution on a destination system is illustrated. As seen in FIG. 2, in the example scenario, a source system 200 comprises an MDM component 202, an SDR component 210 and an SDR component 220 and a destination system 240 comprises an MDM component 242, an SDR component 250 and an SDR component 260. In the example scenario of FIG. 2, SDR component 210 is assigned ownership of block 100 on the source system 200 by MDM component 202. Similarly, ownership of block 100 on the destination system 240 is initially assigned to SDR component 250 by MDM component 242. However, as part of a distribution change, MDM component 242 re-assigns ownership of block 100 on the destination system 240 to SDR component 260. While FIG. 2 is illustrated as having a particular number and configuration of components, source system 200 and destination system 240 may have any other number and configuration of components in other embodiments.

Incoming IO writes that are directed to block 100 on the source system 200 are provided to SDR component 210 for replication to destination system 240. For example, as shown in FIG. 2, an IO write 212 comprising data X that is directed to block 100 is provided to SDR component 210 and later, an IO write 214 comprising data Y that is directed to block 100 is also provided to SDR component 210. Accordingly, the order of IO write operations as received by the source system 200 comprises IO write 212 for writing data X to block 100 followed by IO write 214 for writing data Y to block 100.

As shown in FIG. 2, the IO write 212 for writing data X to block 100 is provided to SDR component 250 of the destination system 240 prior to the distribution change by MDM component 242 while the IO write 214 for writing data Y to block 100 is provided to SDR component 260 after the distribution change by MDM component 242. In this case, because SDR components 250 and 260 are configured to work independently, there may be a case where the order in which data X and data Y is stored in block 100 by SDR components 250 and 260 may be different than that found on the source system 200. For example, as shown in FIG. 2, on the destination system 240, data Y may be written to block 100 by SDR component 260 according to IO write 214 prior to data X being written to block 100 by SDR component 250 according to IO write 212, thereby causing a loss of consistency between the source system 200 and the destination system 240. This is because the older data X may partially or fully overwrite the newer data Y that is stored in block 100 on the destination system 240.

Figure 3:
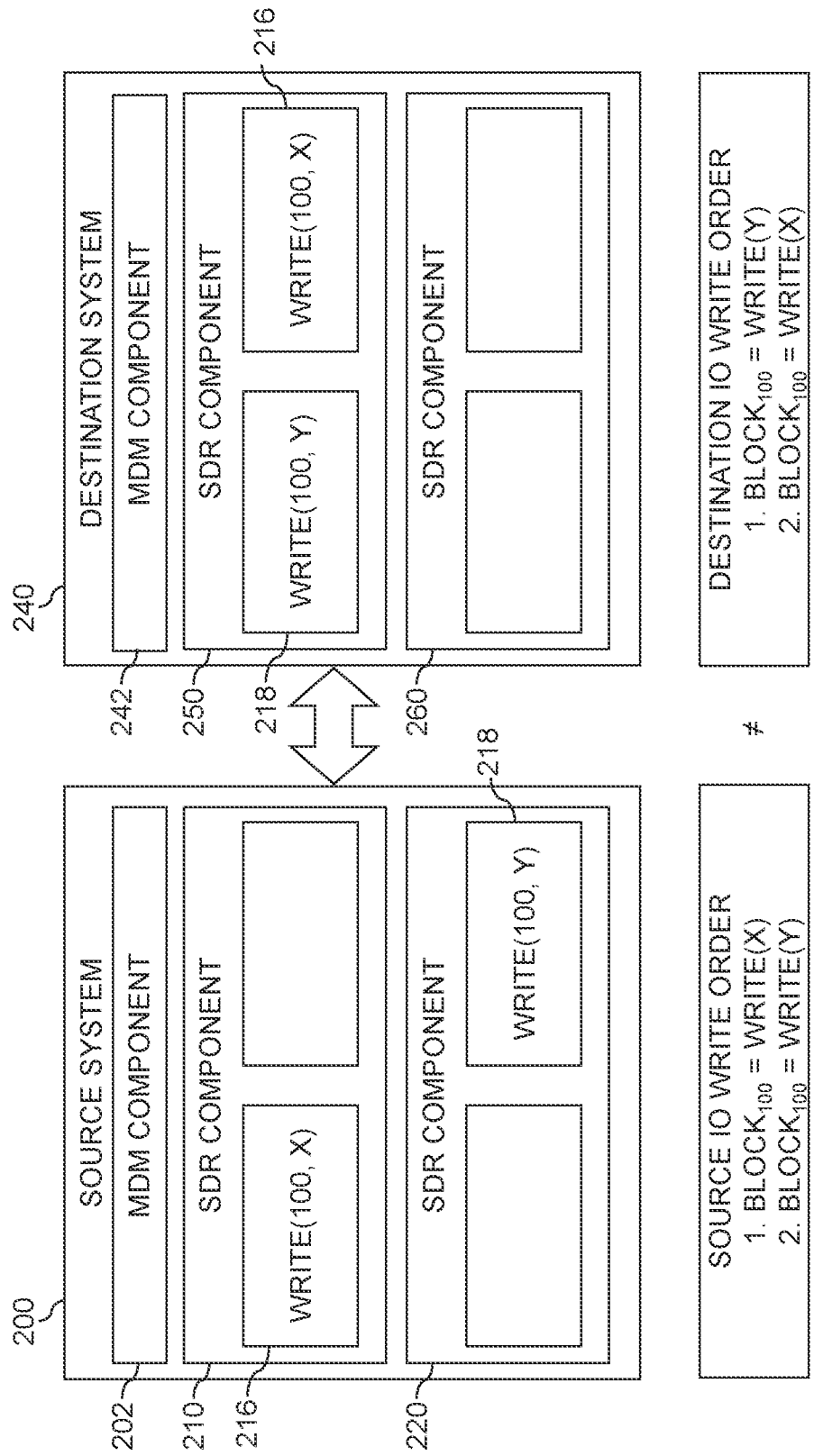
FIG. 3 illustrates an example scenario in which a distribution change in a source system has occurred according to an exemplary embodiment of the disclosure.

With reference now to FIG. 3, an example scenario of a change in the data distribution on a source system is illustrated. The example scenario of FIG. 3 comprises the same configuration of components as FIG. 2. In the example scenario of FIG. 3, SDR component 210 is initially assigned ownership of block 100 on the source system 200 by MDM component 202. However, as part of a distribution change, MDM component 202 re-assigns ownership of block 100 on the source system 200 to SDR component 220. Ownership of block 100 on the destination system 240 is assigned to SDR component 250 by MDM component 242.

Incoming IO writes that are directed to block 100 on the source system 200 are initially provided to SDR component 210 for replication to destination system 240. For example, as shown in FIG. 3, an IO write 216 comprising data X that is directed to block 100 is provided to SDR component 210. After the distribution change by MDM component 202, an IO write 218 comprising data Y that is also directed to block 100 is provided to SDR component 220. Accordingly, the order of IO write operations as received by the source system 200 comprises an IO write 216 provided to SDR component 210 for writing data X to block 100 followed by an IO write 218 provided to SDR component 220 for writing data Y to block 100. In this case, each of SDR components 210 and 220 independently provides their respective data X and Y to SDR component 250, e.g., in response to a closing of a journal barrier that comprises those IO write operations.

As further shown in FIG. 3, however, SDR component 250 receives the IO write operations out of order. For example, since SDR components 210 and 220 act independently of one another, the order in which they provide IO write operations to the SDR components of the destination system 240 is not guaranteed to be consistent due to the distribution change. In the example scenario, SDR component 220 provides IO write 218 to SDR component 250 of the destination system 240 before SDR component 210 provides IO write 216 to SDR component 250.

For example, as shown in FIG. 3, on the destination system 240, data Y may be written to block 100 by SDR component 250 prior to data X due to the order in which the IO writes 218 and 216 are received, thereby causing a loss of consistency between the source system 200 and the destination system 240. This is because the older data X may partially or fully overwrite the newer data Y.

As mentioned above, journal barriers are utilized to ensure that IO operations are replicated in a consistent manner and according to system defined criteria such as, e.g., RPO and RTO. Journal barriers are configured to function as atomic replication units such that as user IO operations that arrive at the source system 200 are saved in the journal barriers on their way to the SDS components of the source system 200. For example, as described above, each journal barrier saves the IO writes which were received between two points in time, the journal barrier opening and the journal barrier closing.

In one example embodiment, the RL sits above the SDS components with the SDR components acting as "men in the middle" since each user IO operation is passed through the RL and SDR components on the way to SDS components. When an IO operation arrives at the RL it is inserted into the current open journal barrier by the SDR components.

The journal barriers are each identified by a corresponding unique identifier (ID) and any IO operations added to the open journal barrier are aggregated together in the source system. When an IO write operation that corresponds to a particular address arrives at the RL, the IO write operation is added to the current open barrier. If another IO write operation to the same address is already found in the current open barrier it is overwritten by the new IO operation in the current open barrier, for example, to take advantage of write folding. Once a journal barrier is closed, any IO write operations that were previously added to that journal barrier are provided to the destination system. As mentioned above, as each journal barrier is closed, e.g., based on the RPO or RTO criteria described above or any other criteria, a new journal barrier is opened such that there is always an open journal barrier in the RL. In illustrative embodiments, each successive journal barrier that is opened will have a unique ID later than the one that is being closed, e.g., larger or any other value that indicates the successive journal barrier was opened later in time than the closed journal barrier.

In one example scenario, once a journal barrier is closed, the RL in the source system transmits the journal barrier to the RL in the destination system. Once the journal barrier is fully transmitted to the RL in the destination system, the RL in the destination system adds the journal barrier to a queue of barriers that are ready to be committed to the SDS components of the destination system, sometimes referred to as a commit ready queue. The RL in the destination system dequeues the journal barriers from the commit ready queue and commits them to the SDS components of the destination system.

While the above scenario appears on its face to maintain a consistent order of IO write operations between the source system and the destination system, additional considerations may be required, for example, as described above in the case of distribution changes in either the source or destination systems. This is because the RLs of the source and destination systems do not each comprise a single component for handling the transfer of the IO write operations from the source system to the destination system or writing the data to the SDS components but rather comprise multiple distributed SDR components in each of the source and destination storage system. In some embodiments, the source system and destination systems may comprise different numbers of SDR components.

IO write operations in the source system pass through different SDR components in the source system's RL on their way to SDS components of the source system according to a distribution in the source DL as defined by the MDM component of the source system. For example, the MDM component distribution may assign each SDR component of the source system to one or more SDS components of the source system for handling IO write operations that target those SDS components. Similarly, replication IO write operations that are provided from the source system to the destination system will arrive at different SDR components in the destination system according to the distribution defined by the MDM component of the destination system for the destination DL and corresponding SDS components in the destination system.

As mentioned above, the MDM components of the source and destination systems may change their respective distributions at any time, e.g., by generating a new distribution instance. In some embodiments, each such distribution instance may have its own unique ID with the unique ID of successive distribution instances increasing monotonically over time. For example, the distributions may be changed by the MDM components in response to SDS components or associated hardware or software components being added to or removed from the source or destination systems, in response to failures in components of the source or destination systems or for any other reason, and a new distribution instance and corresponding unique ID may be generated and implemented.

In illustrative embodiments, an MDM component coordinates between SDR components according to the current active distribution instance. For each journal barrier, each SDR component is assigned a corresponding portion of the journal barrier. For example, a given SDR component may be assigned the portion of the journal barrier that corresponds to an address or SDS component that is owned by that SDR component. The full journal barrier is therefore an aggregation of all of the portions of the journal barrier that are assigned to the respective SDR components.

When the MDM component in the source system decides to close the current open journal barrier and open a new journal barrier, the MDM component will command all of the SDR components of the source system that have been assigned a corresponding portion of the now closed journal barrier to transmit their portions of the closed journal barrier to the destination system asynchronously and independently of each other. Each SDR component then notifies the MDM component of the source system upon completion of the transmission.

The MDM component in the source system tracks the fully transmitted journal barrier portions based on these notifications and determines whether or not the full journal barrier has been transmitted. Once the MDM component in the source system determines that the closed journal barrier has been fully transmitted to the destination system, the MDM component notifies the corresponding MDM component in the destination system about the completed transmission of the closed journal barrier.

The MDM component in the destination system maintains a list of fully transmitted closed journal barriers, i.e., based on notifications received from the MDM component of the source system, and commands the SDR components in the destination system that received the transmitted portions of the closed journal barrier to commit their respective portions of the closed journal barrier. The SDR components may then commit their respective portions of the journal barrier asynchronously and independently from each other. In illustrative embodiments, committing the journal barrier comprises storing the data associated with the journal barrier, e.g., at the corresponding addresses using the corresponding SDS components.

In one example scenario, multiple IO write operations that correspond to the same address and SDS component are received by a source system. In this example scenario, at least a first of the IO write operations is received before a second of the IO write operations. In such a case, if both the first and second IO write operations are received and processed during the same journal barrier, write folding may be utilized. For example, the first IO write operation may be replaced in the journal barrier with the second IO write operation such that the first IO write operation is not transmitted to the destination system by the SDR components of the source system. For example, the data or entry corresponding to the second IO write operation may overwrite the data or entry corresponding to the first IO write operation in the journal barrier.

Part of the above example scenario relies on an understanding that if the first and second IO write operations enter the same journal barrier, they have been passed to the same SDR component according to the current distribution defined by the MDM component, e.g., the SDR component that corresponds to the SDS component associated with the address corresponding to the IO write operations. In a case where they enter in different journal barriers, both operations will be transmitted to the destination system and committed in order based on their respective journal barrier's unique ID. For example, if the first IO write operation arrives while a first journal barrier is open and then the first journal barrier is subsequently closed and a second journal barrier is opened prior to the arrival of the second IO write operation, the first IO write operation is added to the first journal barrier while the second IO write operation is added to the second journal barrier. Since the MDM component of the destination system will instruct the SDR components of the destination system to process the IO write operations in the order of the journal barriers, consistency between the source system and the destination system is maintained. It is important to note that while a given SDR component will commit the IO write operations corresponding to its portion of the journal barriers in order, each SDR component may commit its corresponding IO write operations independently of the other SDR components. For example, a first SDR component may commit its IO write operations for both the first and second journal barriers before a second SDR component commits its IO write operation for the first journal barrier.

In another example scenario, a distribution change occurs in the destination system between the time when the first IO write operation is transmitted from the source system to the destination system and the second IO write operation is transmitted from the source system to the destination system. In this example scenario, both the first and second IO write operations correspond to the same address and arrive in the same journal barrier of the source system. Because the distribution change occurred between the transmission of the first IO write operation and the transmission of the second IO write operation to the destination system, it is possible that the first and second IO write operations may be assigned to different SDR components of the destination system by the MDM component of the destination system. In such a scenario, a result such as that found in FIG. 2 may occur where the first and second IO write operations are committed by the SDR components of the destination system out of order.

In another example scenario, a distribution change occurs in the source system between the time when the first IO write operation arrives at the source system and the second IO write operation arrives at the source system. In this example scenario, both the first and second IO write operations correspond to the same address and arrive in the same journal barrier. Because of the distribution change, it is possible that the first and second IO write operations may be assigned to different SDR components in the source system by the MDM component of the source system, for example, if the distribution change re-assigned the SDS component corresponding to the address from one SDR component of the source system to another SRD component of the source system. In such a scenario, a result such as that found in FIG. 3 may occur where the first and second IO write operations are transmitted to the destination system out of order by the two SDR components of the source system.

Figure 4:
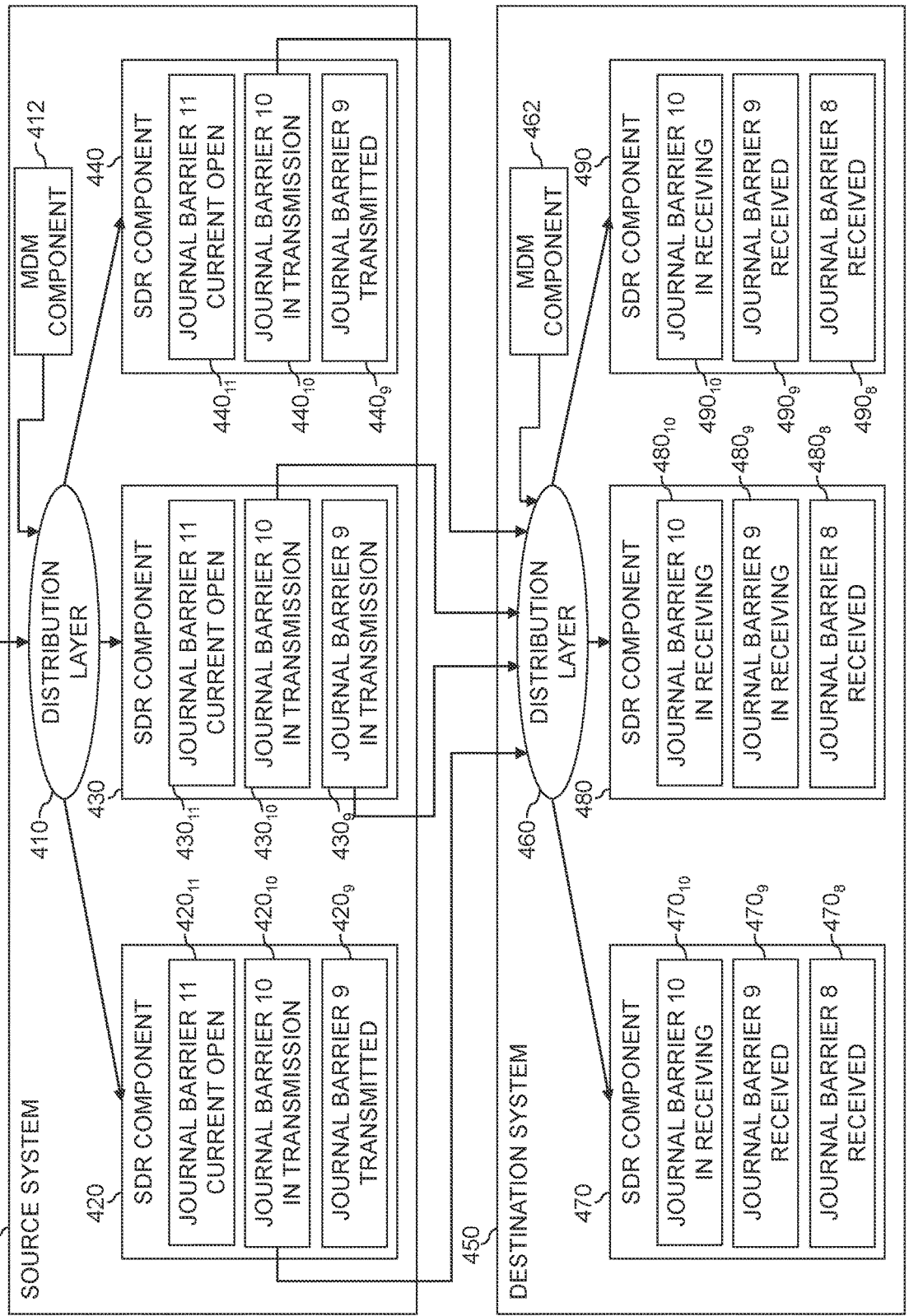
FIG. 4 illustrates an example configuration of source and destination systems for handling a replication of journal barriers according to an exemplary embodiment of the disclosure.

Illustrative embodiments will now be described in more detail with reference to FIG. 4. FIG. 4 illustrates an example configuration of the components utilized in a replication of data from a source system 400 to a destination system 450 according to functionality of asynchronous replication control module 172 (FIG. 1B). Source system 400 and destination system 450 may comprise similar components and features to source system 200 and destination system 240.

As shown in FIG. 4, for example, source system 400 comprises a DL 410, an MDM component 412 and SDR components 420, 430 and 440. Source system 400 also comprises SDS components (not shown for the sake of clarity). Similarly, destination system 450 comprises a DL 460, an MDM component 462 and SDR components 470, 480 and 490. Destination system 450 also comprises SDS components (not shown for the sake of clarity).

Source system 400 is configured to receive IO write operations, referred to herein collectively or individually as IO write operations 402, e.g., from a client device. The IO write operations are passed to the DL 410 for distribution by the DL 410 to the SDR components 420, 430 and 440 according to a distribution instance defined by the MDM component 412 for the source system 400. The SDR components 420, 430 and 440 are configured to store received IO write operations 402 in respective portions $420_{11}$, $430_{11}$, $440_{11}$ of the current open journal barrier, in this example, journal barrier 11.

As each journal barrier is closed, e.g., journal barriers 9 and 10 as shown are closed in FIG. 4, the SDR components 420, 430 and 440 are configured to asynchronously transmit the corresponding IO write operations 402 of their respective portions $420_9$, $430_9$, $440_9$ of journal barrier 9 and $420_{10}$, $430_{10}$, $440_{10}$ of journal barrier 10 to the destination system 450. For example, the journal barriers may be queued in a transmission queue for each SDR component 420, 430 and 440 such that the corresponding portions are separately and asynchronously transmitted in order of journal barrier by each SDR component 420, 430 and 440. Once transmission of a portion of a journal barrier is complete, the SDR component notifies the MDM component 412 with an indication that the portion is complete.

The MDM component 412 is configured to provide an indication that the transmission of a journal barrier is complete to the MDM component 462 of the destination system 450 upon receiving confirmation that all portions of a particular journal barrier have been transmitted from the SDR components 420, 430 and 440 to the destination system 450. For example, as shown in FIG. 4, since journal barrier 8 has been fully transmitted, MDM component 412 has provided the indication that the transmission of journal barrier 8 is complete to MDM component 462. In contrast, since portion $430_9$ of journal barrier 9 is still being transmitted by SDR component 430, the indication has not yet been provided.

Destination system 450 is configured to receive the IO write operations 402 of the portions $420_9$, $430_9$, $440_9$ and $420_{10}$, $430_{10}$, $440_{10}$ of journal barriers 9 and 10 from the SDR components 420, 430 and 440 of the source system 400. The IO write operations 402 of the journal barriers 9 and 10 are passed to the DL 460 for distribution by the DL 460 to the SDR components 470, 480 and 490 according to a distribution instance defined by the MDM component 462 for the destination system 450.

In one example, IO write operations 402 that are grouped together and distributed to a single SDR component on the source system 400 may be distributed to multiple different SDR components on the destination system 450 based on differences in the distribution instances of the source and destination systems 400 and 450. In another example, IO write operations 402 that are distributed to multiple different SDR components on the source system 400 may be grouped together and distributed to a single SDR component on the destination system 450 based on differences in the distribution instances of the source and destination systems 400 and 450.

The SDR components 470, 480 and 490 are configured to store the received IO write operations 402 in respective portions of the closed journal barriers, e.g., portions $470_9$, $480_9$, $490_9$ and $470_{10}$, $480_{10}$, $490_{10}$ of journal barriers 9 and 10. When the MDM component 462 of the destination system 450 receives an indication from MDM component 412 of the source system 400 that the transmission for a particular journal barrier is complete, the SDR components 470, 480 and 490 each add their respective portion of that journal barrier to a commit ready queue and are configured to individually and asynchronously commit their respective portions of that journal barrier to the SDS components of the destination system 450 according to their commit ready queue. For example, as shown in FIG. 4, since journal barrier 8 has been fully transmitted, MDM component 462 instructs SDR components 470, 480 and 490 to commit their respective portions of journal barrier 8 and they add journal barrier 8 to their commit ready queue. However, if journal barriers 9 and 10 were to be fully transmitted and also added to the respective commit ready queues, it may be possible for one SDR component to commit its portions of multiple journal barriers, e.g., journal barriers 8, 9 and 10, before another SDR component commits its portion of even one of the journal barriers, e.g., journal barrier 8. For example, differences in the processing power or resources available to a particular SDR component, an amount of data stored in its portions of the journal barriers, or other factors may contribute to one SDR component committing its corresponding portions of multiple journal barriers before another SDR component commits its portion of one of those journal barriers, e.g., due to the asynchronous nature of the SDR components.

While source system 400 and destination system 450 are each shown as having three SDR components in illustrative embodiments for the sake of clarity, any other number of SDR components may be utilized by source and destination systems 400 and 450 and the number of SDR components for each of the source and destination systems 400 and 450 do not need to be the same.

Figure 5:
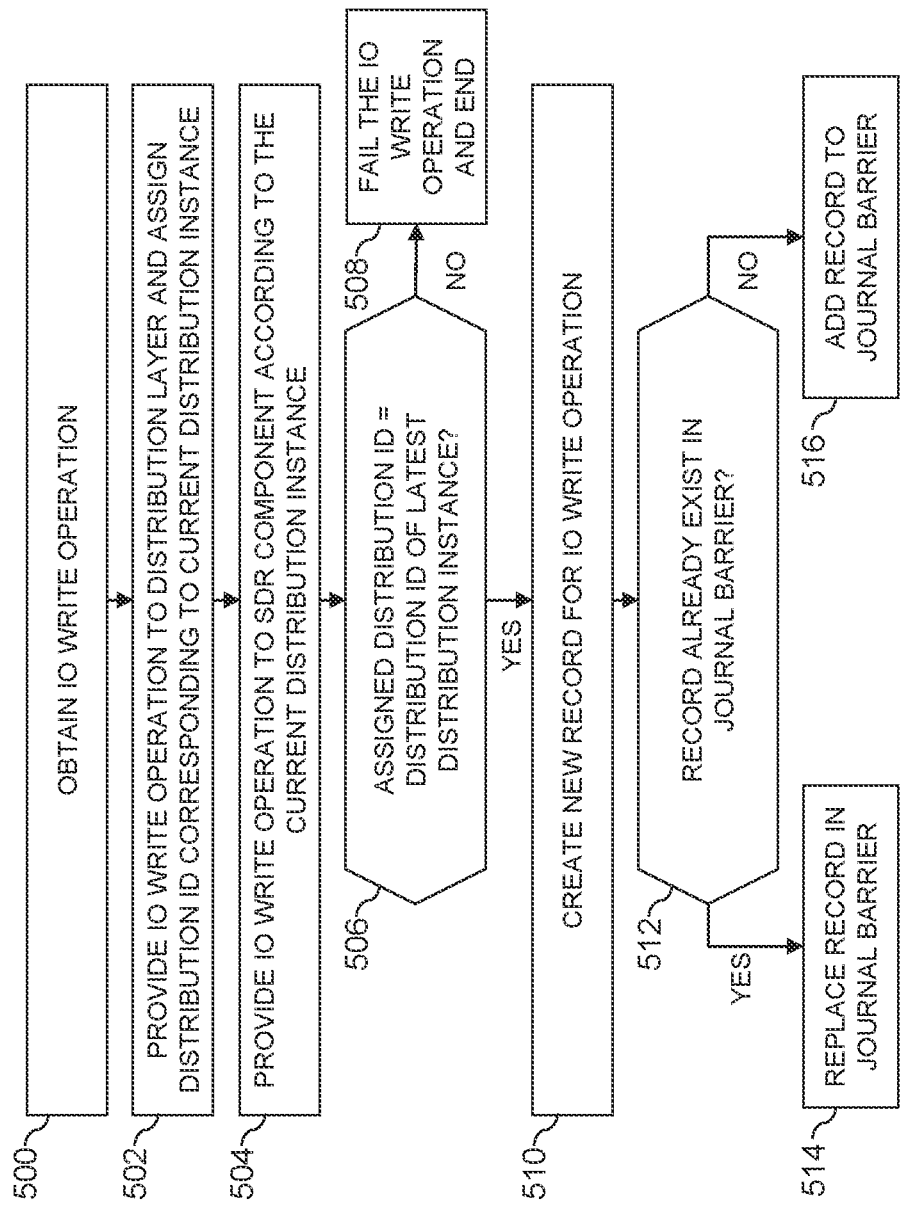
FIG. 5 is a flow diagram of an example process for handling incoming IO write operations according to an exemplary embodiment of the disclosure.

With reference now to FIGS. 4 and 5, an example process for handling an incoming 10 write operation 402 according to illustrative embodiments will now be described. While described with reference to SDR component 420, any other SDR component may be utilized.

At step 500, an IO write operation 402 corresponding to a particular offset is obtained by the source system 400.

At step 502, the IO write operation 402 is provided to the distribution layer 410 and assigned a distribution ID corresponding to the current distribution instance defined by the MDM component 412 of the source system 400.

At step 504, the IO write operation 402 is provided to the corresponding SDR component for the particular offset according to the current distribution instance. In one example embodiment, if SDR component 420 is mapped to the address in the distribution instance, the IO write operation 402 may be provided to SDR component 420.

At step 506, the SDR component 420 validates the assigned distribution ID of the IO write operation 402, for example, by comparing the assigned distribution ID to the distribution ID of the latest distribution instance that was provided to the SDR component 420 by the MDM component 412.

If the assigned distribution ID of the IO write operation 402 is not equal to the distribution ID of the latest distribution instance that was provided to the SDR component 420 by the MDM component 412, the SDR component 420 fails the IO write operation at step 508 and ends the process. For example, in a case where the IO write operation 402 is received after a distribution change but before the new distribution instance has been propagated out to the SDR component 420 by MDM component 412, the distribution ID assigned to the IO write operation 402 will be different than the latest distribution instance that was provided to the SDR component 420.

If the distribution ID matches the distribution ID of the latest distribution instance that was provided to the SDR component 420 by the MDM component 412, the process proceeds to step 510.

At step 510, the SDR component 420 creates a new record for this IO write operation, in which both the user data and the offset are stored.

At step 512, the SDR component 420 determines whether a record corresponding to the address already exists in the current open journal barrier, e.g., journal barrier 11. If a record already exists, the SDR component 420 replaces the existing record with the new record at step 514. If a record does not already exist, the new record is added to the current open journal barrier, e.g., journal barrier 11, by the SDR component 420 at step 516.

Figure 6:
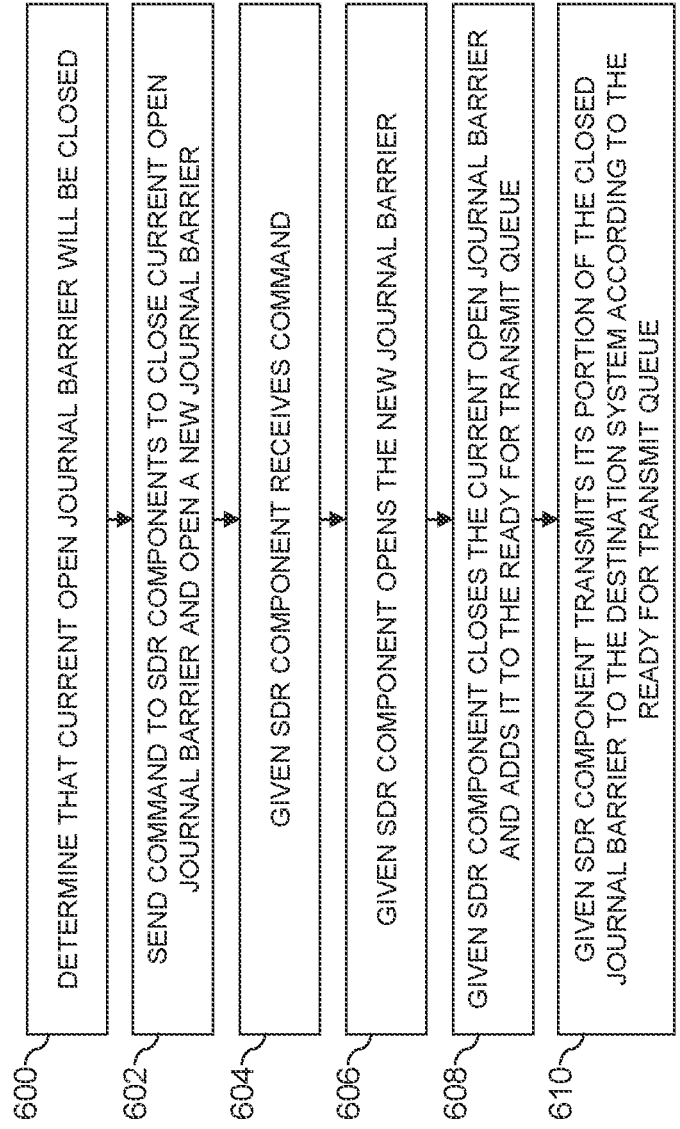
FIG. 6 is a flow diagram of an example process for closing a journal barrier according to an exemplary embodiment of the disclosure.

With reference now to FIGS. 4 and 6, an example process for closing a journal barrier and opening a new journal barrier according to illustrative embodiments will now be described.

At step 600, the MDM component 412 of the source system 400 determines that the current open journal barrier needs to be closed, e.g., based on the RTO threshold, RPO threshold or for any other reason.

At step 602, the MDM component 412 sends a command to all of the SDR components of the source system 400, e.g., SDR components 420, 430 and 440, to close the current open journal barrier and to open a new journal barrier for receiving IO write operations 402. In some embodiments, the command will comprise a journal barrier ID for the new journal barrier, e.g., journal barrier 11.

At step 604, a given SDR component receives the command.

At step 606, the given SDR component opens the new journal barrier for receiving new IO write operations 402.

At step 608, the given SDR component closes the current open journal barrier and adds it to the ready for transmit queue.

At step 610, the given SDR component transmits its portion of the closed journal barrier to the destination system 450 according to the ready for transmit queue.

Figure 7:
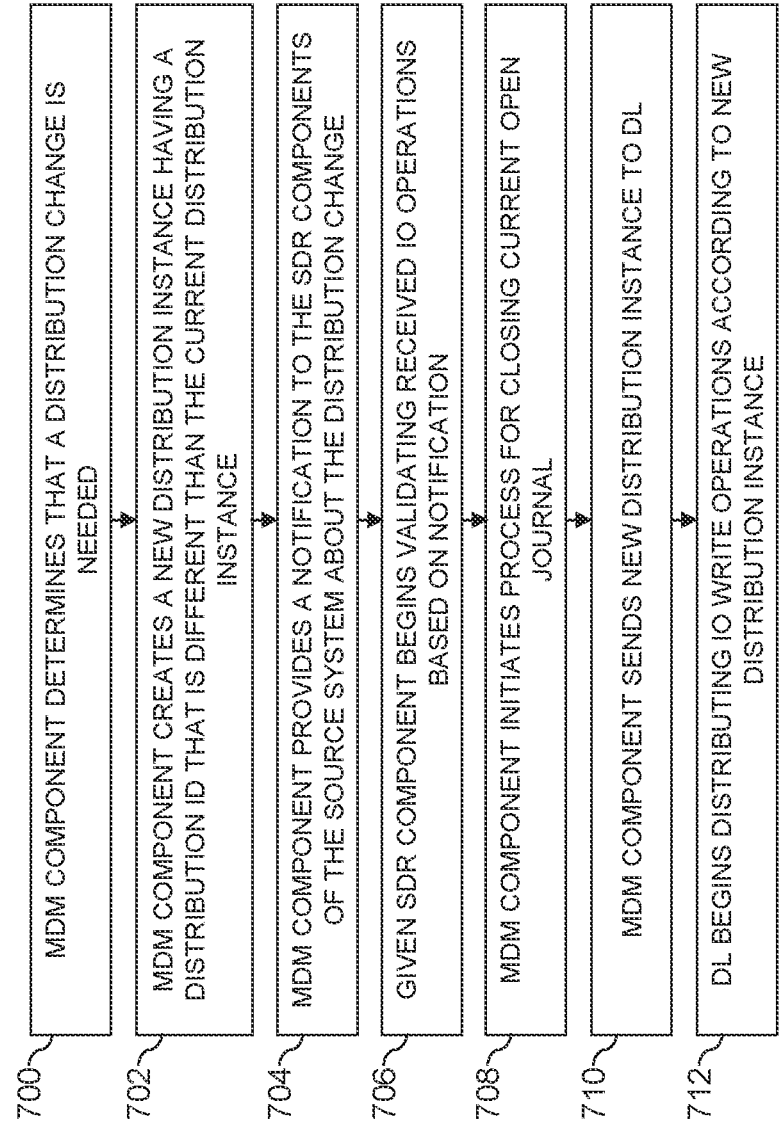
FIG. 7 is a flow diagram of an example process for a distribution change in a source system according to an exemplary embodiment of the disclosure.

With reference now to FIGS. 4 and 7, an example process for a distribution change in the source system 400 barrier according to illustrative embodiments will now be described.

At step 700, MDM component 412 determines that a distribution change is needed, e.g., due to a change in hardware or software configuration on the source system 400.

At step 702, MDM component 412 creates a new distribution instance having a distribution ID that is different than the current distribution instance in use by the DL 410. For example, if the current distribution instance has a distribution ID of 10, the new distribution instance may have a distribution ID of 11. In illustrative embodiments, a different distribution ID may comprise an increase in a value of the distribution ID, a decrease in value of the distribution ID or any other difference in a value of the distribution ID as compared to the current distribution instance distribution ID that may be utilized to determine that the current distribution instance was created prior to the new distribution instance.

At step 704, MDM component 412 provides a notification to the SDR components of the source system 400, e.g., SDR components 420, 430 and 440, about the distribution change. For example, the notification may comprise an indication of the distribution ID of the new distribution instance.

At step 706, a given SDR component of the source system 400 begins validating received IO write operations 402 based on the notification. For example, using the distribution ID of the new distribution instance as described above with reference to the flowchart of FIG. 5.

At step 708, MDM component 412 initiates the process for closing the current open journal barrier and transmits the command to the SDR components of the source system 400, e.g., as described above with reference to the flowchart of FIG. 6.

At step 710, MDM component 412 sends the new distribution instance to the DL 410.

At step 712, the DL 410 begins distributing IO write operations 402 according to the new distribution instance, e.g., according to the flowchart of FIG. 5.

Figure 8:
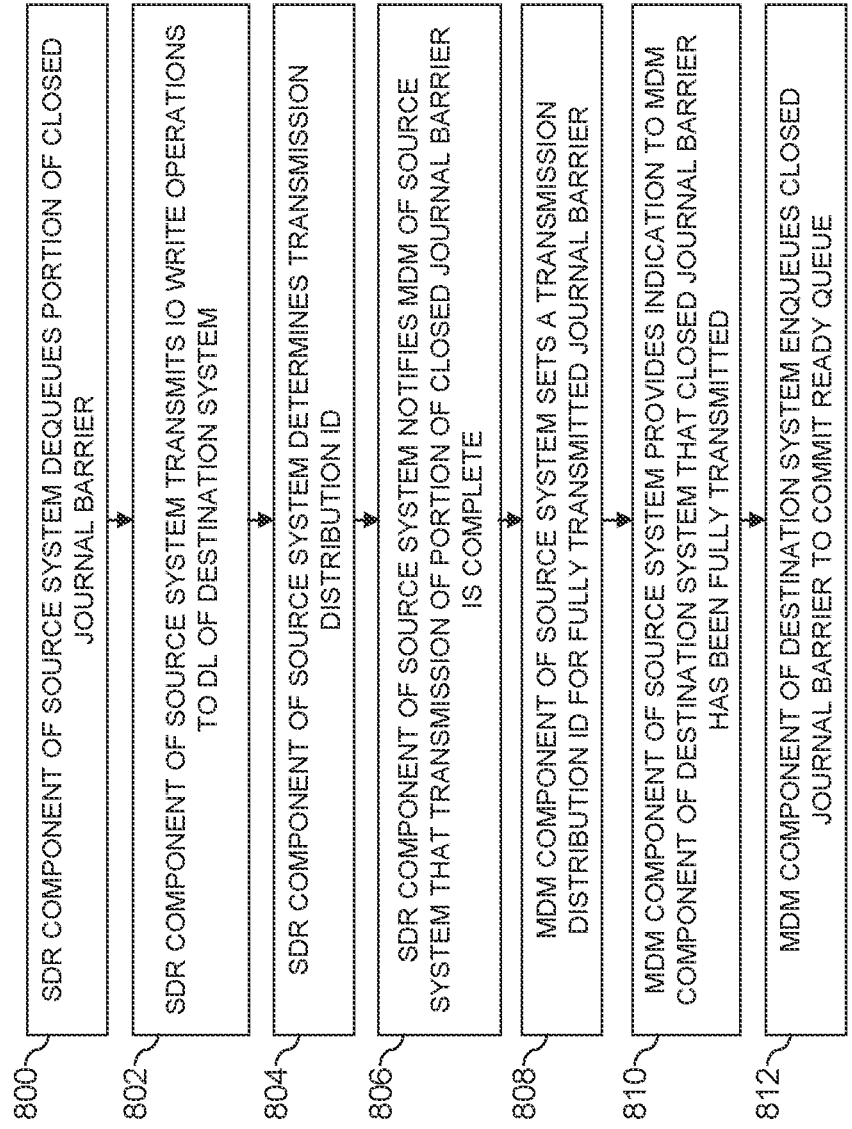
FIG. 8 is a flow diagram of an example process for transmitting a closed journal barrier from a source system to a destination system according to an exemplary embodiment of the disclosure.

With reference now to FIGS. 4 and 8, an example process for transmitting a closed journal barrier from the source system 400 to the destination system 450 according to illustrative embodiments will now be described.

At step 800, each SDR component of the source system 400 dequeues its portion of the closed journal barrier from its ready for transmit queue. For example, if multiple journal barriers have been closed, the IO write operations 402 of the earliest closed journal barrier that has not yet been transmitted to the destination system 450 by the SDR components will be at the head of the ready for transmit queue and will be dequeued by the SDR component of the source system 400.

At step 802, the SDR components of the source system 400 transmit all of the dequeued IO write operations 402 for the closed journal barrier to the DL 460 of the destination system 450. Each transmitted IO write operation 402 arrives at a corresponding SDR component of the destination system 450 according to the current distribution instance of the destination system 450.

At step 804, the SDR components of the source system 400 determine transmission distribution ID values for the closed journal barrier. For example, if all of the IO write operations 402 in the closed journal barrier that were transmitted to the destination system 450 by a given SDR component were transmitted according to the same distribution ID, e.g., no distribution change occurred, the transmission distribution ID for the closed journal for that SDR component is determined to be the distribution ID. However, if one or more of the IO write operations 402 that were transmitted to the destination system 450 by the given SDR component were transmitted according to a different distribution ID, the transmission distribution ID for the closed journal is determined to have a value of mixed.

At step 806, once the transmission of all of the IO write operations by the given SDR have been completed, the given SDR component notifies the MDM component 412 that the transmission of its portion of the closed journal barrier is complete and provides the determined transmission distribution ID to the MDM component 412.

At step 808, when all of the SDR components of the source system 400 have notified the MDM component 412 of the completed transmissions, e.g., the closed journal barrier has been fully transmitted to the destination system 450, the MDM component 412 marks the closed journal barrier as transmitted and sets a transmission distribution ID for the fully transmitted journal barrier based on the transmission distribution IDs provided by the SDR components of the source system 400. For example, if all of the SDR components reported the same transmission distribution ID for their portion of the closed journal barrier, the transmission distribution ID for the full closed journal barrier is the reported transmission distribution ID. On the other hand, if one or more of the SDR components reported a transmission distribution ID value of mixed, the transmission distribution ID for the full closed journal barrier is set to mixed.

At step 810, the MDM component 412 of the source system 400 provides an indication to the MDM component 462 of the destination system 450 that the closed journal barrier has been fully transmitted and provides the MDM component 462 with the determined transmission distribution ID of the full closed journal barrier.

At step 812, the MDM component 462 of the destination system enqueues the closed journal barrier in a commit ready queue.

Figure 9:
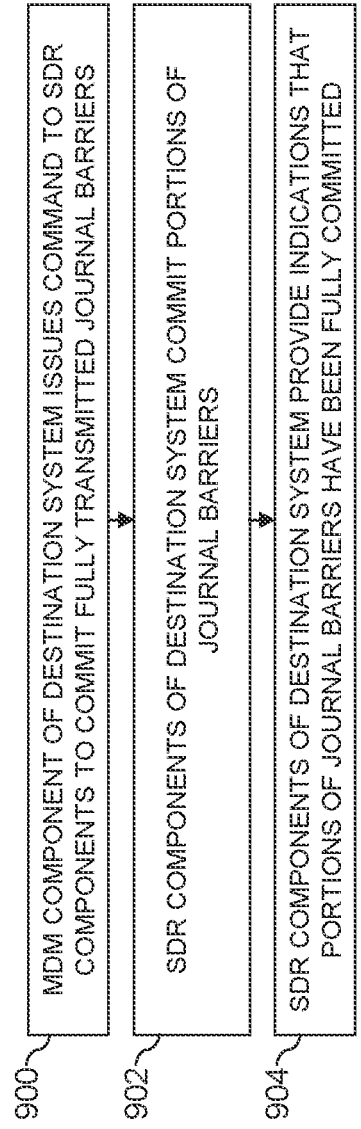
FIG. 9 is a flow diagram of an example process for committing fully transmitted journal barriers according to an exemplary embodiment of the disclosure.

With reference now to FIGS. 4 and 9, an example process for committing a journal barrier in the destination system 450 according to illustrative embodiments will now be described.

At step 900, the MDM component 462 of the destination system 450 issues a command to the SDR components to commit a fully transmitted journal barrier. For example, if multiple journal barriers have been fully transmitted, the MDM component 462 may issue a command to commit any journal barriers up to the latest fully transmitted journal barrier. In the example of FIG. 4, journal barrier 8 is the latest fully transmitted journal barrier.

At step 902, each SDR component commits its portion of each journal barrier up to the latest fully transmitted journal barrier in order in response to the command. For example, if journal barriers 8 and 9 were fully transmitted and the command was issued by MDM component 462 to commit up to journal barrier 9, SDR component 470 would first commit portion 4708 of journal barrier 8 followed by portion $470_9$ of journal barrier 9. Similarly, SDR component 480 would first commit portion 4808 of journal barrier 8 followed by portion $480_9$ of journal barrier 9 and SDR component 490 would first commit portion 4908 of journal barrier 8 followed by portion $490_9$ of journal barrier 9. It is important to note that because the SDR components 470, 480 and 490 are configured to operate independently of one another in an asynchronous manner it may be possible that, for example, SDR component 470 completes the commitment of portions 4708 and $470_9$ of journal barriers 8 and 9 before one or both of SDR components 480 and 490 complete commitment of their respective portions 4808 and 4908 of journal barrier 8.

At step 904, each SDR component of the destination system 450 provides an indication to MDM component 462 when its portion of a journal barrier has been fully committed. For example, SDR component 470 may provide an indication to MDM component 462 when its portion 4708 of journal barrier 8 has been committed. In the further example mentioned above, where commitment of journal barrier 9 has been commanded by MDM component 462, SDR component 470 may provide another indication to MDM component 462 when its portion $470_9$ of journal barrier 9 has been committed.

The MDM component 462 of the destination system 450 maintains an indication of the highest fully committed journal barrier, e.g., as reported by SDR components of the destination system 450, where a journal barrier is considered fully committed if all of the SDR components have reported to the MDM component 462 that they have completed the commitment of their portion of the journal barrier.

MDM component 462 is configured to command the SDR components of the destination system 450 to commit any journal barriers that are indicated to have been fully transmitted by the MDM component 412 of the source system 400, e.g., those found in the commit ready queue. In illustrative embodiments, the MDM component 462 may utilize the following example criteria for determining whether or not to command the commitment of journal barriers up to the latest fully transmitted journal barrier.

For any two consecutive journal barriers within the range of journal barriers found in the commit ready queue, the MDM component 462 is configured to determine whether or not both journal barriers have the same transmission distribution ID and also whether or not the oldest journal barrier has a transmission distribution ID equal to the mixed value. If the transmission distribution ID is the same and the transmission distribution ID of the oldest journal barrier does not have the mixed value for any two consecutive journal barriers in the range, the MDM component 462 may command the SDR component to commit the journal barriers up to the latest journal barrier in the range.

The above logic ensures that all journal barriers that are earlier than a journal barrier having a transmission distribution ID value of mixed will be fully committed before any portion of the journal barrier having the transmission distribution ID value of mixed is committed. This includes all portions of that journal barrier on all SDR components of the destination system 450. This ensures that in the event of a distribution change, two SDR components will not overwrite the same address out of order since the mixed transmission distribution ID value indicates to the SDR components that there is a potential for an overwrite and inhibits the overwrite from occurring out of order.

FIG. 10 schematically illustrates a framework of a server node 1000 for implementing a storage node (e.g., storage node 140, FIGS. 1A and 1B) according to an exemplary embodiment of the disclosure. The server node 1000 comprises processors 1002, storage interface circuitry 1004, network interface circuitry 1006, virtualization resources 1008, system memory 1010, and storage resources 1016. The system memory 1010 comprises volatile memory 1012 and non-volatile memory 1014. The processors 1002 comprise one or more types of hardware processors that are configured to process program instructions and data to execute a native operating system (OS) and applications that run on the server node 1000.

For example, the processors 1002 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 1004 enables the processors 1002 to interface and communicate with the system memory 1010, the storage resources 1016, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 1006 enables the server node 1000 to interface and communicate with a network and other system components. The network interface circuitry 1006 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, IO adaptors, converged Ethernet adaptors, etc.) to support communication protocols and interfaces including, but not limited to, PCIe, DMA and RDMA data transfer protocols, etc.

The virtualization resources 1008 can be instantiated to execute one or more service or functions which are hosted by the server node 1000. For example, the virtualization resources 1008 can be configured to implement the various modules and functionalities of the storage control system 150 (FIG. 1B) as discussed herein. In one embodiment, the virtualization resources 1008 comprise virtual machines that are implemented using a hypervisor platform which executes on the server node 1000, wherein one or more virtual machines can be instantiated to execute functions of the server node 1000. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 1000, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 1008 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 1000 as well execute one or more of the various modules and functionalities of the storage control system 150 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of the storage control systems, source systems and destination systems comprise program code that is loaded into the system memory 1010 (e.g., volatile memory 1012), and executed by the processors 1002 to perform respective functions as described herein. In this regard, the system memory 1010, the storage resources 1016, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 1010 comprises various types of memory such as volatile RAM, NVRAM, or other types of memory, in any combination. The volatile memory 1012 may be a dynamic random-access memory (DRAM) (e.g., DRAM DIMM (Dual In-line Memory Module), or other forms of volatile RAM. The non-volatile memory 1014 may comprise one or more of NAND Flash storage devices, SSD devices, or other types of next generation non-volatile memory (NGNVM) devices. The system memory 1010 can be implemented using a hierarchical memory tier structure wherein the volatile memory 1012 is configured as the highest-level memory tier, and the non-volatile memory 1014 (and other additional non-volatile memory devices which comprise storage-class memory) is configured as a lower level memory tier which is utilized as a high-speed load/store non-volatile memory device on a processor memory bus (i.e., data is accessed with loads and stores, instead of with IO reads and writes). The term "memory" or "system memory" as used herein refers to volatile and/or non-volatile memory which is utilized to store application program instructions that are read and processed by the processors 1002 to execute a native operating system and one or more applications or processes hosted by the server node 1000, and to temporarily store data that is utilized and/or generated by the native OS and application programs and processes running on the server node 1000. The storage resources 1016 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising a source system comprising at least one processing device coupled to memory, the at least one processing device implementing a distribution layer, a management component and a plurality of distributed replication components, the distribution layer being configured:
   to obtain an input-output operation corresponding to an address;
   to identify a given replication component of the plurality of distributed replication components that corresponds to the address based at least in part on a distribution instance obtained from the management component;
   to assign a first distribution identifier corresponding to the distribution instance to the input-output operation; and
   to provide the obtained input-output operation to the given replication component with the first distribution identifier; and the given replication component being configured:
   to obtain a second distribution identifier from the management component;
   to determine whether or not the first distribution identifier is equal to the second distribution identifier; and
   to perform at least one action on the obtained input-output operation based at least in part on the determination of whether or not the first distribution identifier is equal to the second distribution identifier.

2. The apparatus of claim 1 wherein:
the management component is further configured to perform a distribution change from the distribution instance to a new distribution instance;
the second distribution identifier corresponds to the new distribution instance;
determining whether or not the first distribution identifier is equal to the second distribution identifier comprises determining that the first distribution identifier is not equal to the second distribution identifier; and
performing the at least one action on the obtained input-output operation based at least in part on the determination of whether or not the first distribution identifier is equal to the second distribution identifier comprises failing the input-output operation.

3. The apparatus of claim 1 wherein:
the management component is further configured:
   to perform a distribution change from the distribution instance to a new distribution instance; and
   to instruct the replication components to close a current open journal barrier;
the given replication component is further configured:
   to transmit a portion of the closed journal barrier that is under ownership of the given replication component to a destination system; and
   in response to a completion of the transmission of the portion, to provide an indication to the management component that the transmission of the portion is complete.

4. The apparatus of claim 3 wherein the given replication component is further configured:
   to determine a transmission distribution identifier for the portion of the closed journal barrier, the transmission distribution identifier corresponding to one or more distribution instances that were utilized while the journal barrier was open; and to provide an indication of the transmission distribution identifier to the management component.

5. The apparatus of claim 4 wherein the transmission distribution identifier corresponding to one or more distribution instances that were utilized while the journal barrier was open comprises one of:
an indication that a single distribution instance was in use for the journal barrier; and
an indication a mix of distribution instances were in use for the journal barrier.

6. The apparatus of claim 5 wherein the management component is further configured:
to determine that each replication component has indicated that a transmission of the journal barrier is complete;
to determine whether or not any of the replication components provided an indication that a mix of distribution instances were in use for the journal barrier;
responsive to determining that any of the replication components provided an indication that a mix of distribution instances were in use, to generate a full transmission distribution identifier for the closed journal barrier that indicates that a mix of distribution instances were used;
responsive to determining that none of the replication components provided an indication that a mix of distribution instances were in use, to generate a full transmission distribution identifier for the closed journal barrier that indicates that only one distribution instance was used; and
to provide the full transmission distribution identifier and an indication that the closed journal barrier is fully transmitted to the destination system.

7. The apparatus of claim 6 wherein the destination system is configured:
based on a receipt of the indication that the transmission of the closed journal barrier is complete, to add the closed journal barrier to a queue of journal barriers that are ready to be committed to storage;
to identify a journal barrier of the queue of journal barriers to which replication components of the destination system will commit asynchronously to storage, the identification of the journal barrier of the queue of journal barriers comprising:
determining an earliest journal barrier in the queue of journal barriers that has a corresponding full transmission distribution identifier that indicates that a mix of distribution instances were used; and
identifying a journal barrier that is prior to the earliest journal barrier that has the corresponding full transmission distribution identifier that indicates that the mix of distribution instances were used as the journal barrier to which the replication components of the destination system will commit asynchronously to storage.

8. A method comprising:
obtaining, by a distribution layer of a source system, an input-output operation corresponding to an address;
identifying, by the distribution layer, a given replication component of a plurality of distributed replication components of the source system that corresponds to the address based at least in part on a distribution instance obtained from a management component of the source system;
assigning, by the distribution layer, a first distribution identifier corresponding to the distribution instance to the input-output operation;

providing, by the distribution layer, the obtained input-output operation to the given replication component with the first distribution identifier;
obtaining, by the given replication component, a second distribution identifier from the management component;
determining, by the given replication component, whether or not the first distribution identifier is equal to the second distribution identifier; and
performing, by the given replication component, at least one action on the obtained input-output operation based at least in part on the determination of whether or not the first distribution identifier is equal to the second distribution identifier;
wherein the source system comprises at least one processing device coupled to memory that implements the distribution layer, management component and plurality of distributed replication components and the method is implemented by the source system.

9. The method of claim 8 wherein:
the method further comprises performing, by the management component, a distribution change from the distribution instance to a new distribution instance;
the second distribution identifier corresponds to the new distribution instance;
determining whether or not the first distribution identifier is equal to the second distribution identifier comprises determining that the first distribution identifier is not equal to the second distribution identifier; and
performing the at least one action on the obtained input-output operation based at least in part on the determination of whether or not the first distribution identifier is equal to the second distribution identifier comprises failing the input-output operation.

10. The method of claim 8 wherein the method further comprises:
performing, by the management component, a distribution change from the distribution instance to a new distribution instance; and
instructing, by the management component, the replication components to close a current open journal barrier;
transmitting, by the given replication component, a portion of the closed journal barrier that is under ownership of the given replication component to a destination system; and
in response to a completion of the transmission of the portion, providing, by the given replication component, an indication to the management component that the transmission of the portion is complete.

11. The method of claim 10 wherein the method further comprises:
determining, by the given replication component, a transmission distribution identifier for the portion of the closed journal barrier, the transmission distribution identifier corresponding to one or more distribution instances that were utilized while the journal barrier was open; and
providing, by given replication component, an indication of the transmission distribution identifier to the management component.

12. The method of claim 11 wherein the transmission distribution identifier corresponding to one or more distribution instances that were utilized while the journal barrier was open comprises one of:
an indication that a single distribution instance was in use for the journal barrier; and an indication a mix of distribution instances were in use for the journal barrier.

13. The method of claim 12 wherein the method further comprises:
   determining, by the management component, that each replication component has indicated that a transmission of the journal barrier is complete;
   determining, by the management component, whether or not any of the replication components provided an indication that a mix of distribution instances were in use for the journal barrier;
   responsive to determining that any of the replication components provided an indication that a mix of distribution instances were in use, generating, by the management component, a full transmission distribution identifier for the closed journal barrier that indicates that a mix of distribution instances were used;
   responsive to determining that none of the replication components provided an indication that a mix of distribution instances were in use, generating, by the management component, a full transmission distribution identifier for the closed journal barrier that indicates that only one distribution instance was used; and
   providing, by the management component, the full transmission distribution identifier and an indication that the closed journal barrier is fully transmitted to the destination system.

14. The method of claim 13 wherein the destination system is configured:
   based on a receipt of the indication that the transmission of the closed journal barrier is complete, to add the closed journal barrier to a queue of journal barriers that are ready to be committed to storage;
   to identify a journal barrier of the queue of journal barriers to which replication components of the destination system will commit asynchronously to storage, the identification of the journal barrier of the queue of journal barriers comprising:
      determining an earliest journal barrier in the queue of journal barriers that has a corresponding full transmission distribution identifier that indicates that a mix of distribution instances were used; and
      identifying a journal barrier that is prior to the earliest journal barrier that has the corresponding full transmission distribution identifier that indicates that the mix of distribution instances were used as the journal barrier to which the replication components of the destination system will commit asynchronously to storage.

15. A computer program product comprising a non-transitory processor-readable storage medium having stored therein program code of one or more software programs, wherein the program code when executed by at least one processing device of a source system, the at least one processing device comprising a processor coupled to memory and implementing a distribution layer, a management component and a plurality of distributed replication components:
   causes the distribution layer:
      to obtain an input-output operation corresponding to an address;
      to identify a given replication component of the plurality of distributed replication components that corresponds to the address based at least in part on a distribution instance obtained from the management component;
      to assign a first distribution identifier corresponding to the distribution instance to the input-output operation; and
      to provide the obtained input-output operation to the given replication component with the first distribution identifier; and
   causes the given replication component:
      to obtain a second distribution identifier from the management component;
      to determine whether or not the first distribution identifier is equal to the second distribution identifier; and
      to perform at least one action on the obtained input-output operation based at least in part on the determination of whether or not the first distribution identifier is equal to the second distribution identifier.

16. The computer program product of claim 15 wherein:
   the program code further causes the management component to perform a distribution change from the distribution instance to a new distribution instance;
   the second distribution identifier corresponds to the new distribution instance;
   determining whether or not the first distribution identifier is equal to the second distribution identifier comprises determining that the first distribution identifier is not equal to the second distribution identifier; and
   performing the at least one action on the obtained input-output operation based at least in part on the determination of whether or not the first distribution identifier is equal to the second distribution identifier comprises failing the input-output operation.

17. The computer program product of claim 15 wherein:
   the program code further causes the management component:
      to perform a distribution change from the distribution instance to a new distribution instance; and
      to instruct the replication components to close a current open journal barrier;
   the program code further causes the given replication component:
      to transmit a portion of the closed journal barrier that is under ownership of the given replication component to a destination system; and
      in response to a completion of the transmission of the portion, to provide an indication to the management component that the transmission of the portion is complete.

18. The computer program product of claim 17 wherein the program code further causes the given replication component:
   to determine a transmission distribution identifier for the portion of the closed journal barrier, the transmission distribution identifier corresponding to one or more distribution instances that were utilized while the journal barrier was open; and
   to provide an indication of the transmission distribution identifier to the management component;
   wherein the transmission distribution identifier corresponding to one or more distribution instances that were utilized while the journal barrier was open comprises one of:
      an indication that a single distribution instance was in use for the journal barrier;
      and an indication a mix of distribution instances were in use for the journal barrier.

19. The computer program product of claim 18 wherein the program code further causes the management component:
- to determine that each replication component has indicated that a transmission of the journal barrier is complete;
- to determine whether or not any of the replication components provided an indication that a mix of distribution instances were in use for the journal barrier;
- responsive to determining that any of the replication components provided an indication that a mix of distribution instances were in use, to generate a full transmission distribution identifier for the closed journal barrier that indicates that a mix of distribution instances were used;
- responsive to determining that none of the replication components provided an indication that a mix of distribution instances were in use, to generate a full transmission distribution identifier for the closed journal barrier that indicates that only one distribution instance was used; and
- to provide the full transmission distribution identifier and an indication that the closed journal barrier is fully transmitted to the destination system.

20. The computer program product of claim 19 wherein the destination system is configured:
- based on a receipt of the indication that the transmission of the closed journal barrier is complete, to add the closed journal barrier to a queue of journal barriers that are ready to be committed to storage;
- to identify a journal barrier of the queue of journal barriers to which replication components of the destination system will commit asynchronously to storage, the identification of the journal barrier of the queue of journal barriers comprising:
  - determining an earliest journal barrier in the queue of journal barriers that has a corresponding full transmission distribution identifier that indicates that a mix of distribution instances were used; and
  - identifying a journal barrier that is prior to the earliest journal barrier that has the corresponding full transmission distribution identifier that indicates that the mix of distribution instances were used as the journal barrier to which the replication components of the destination system will commit asynchronously to storage.

* * * * *